Figure 1:
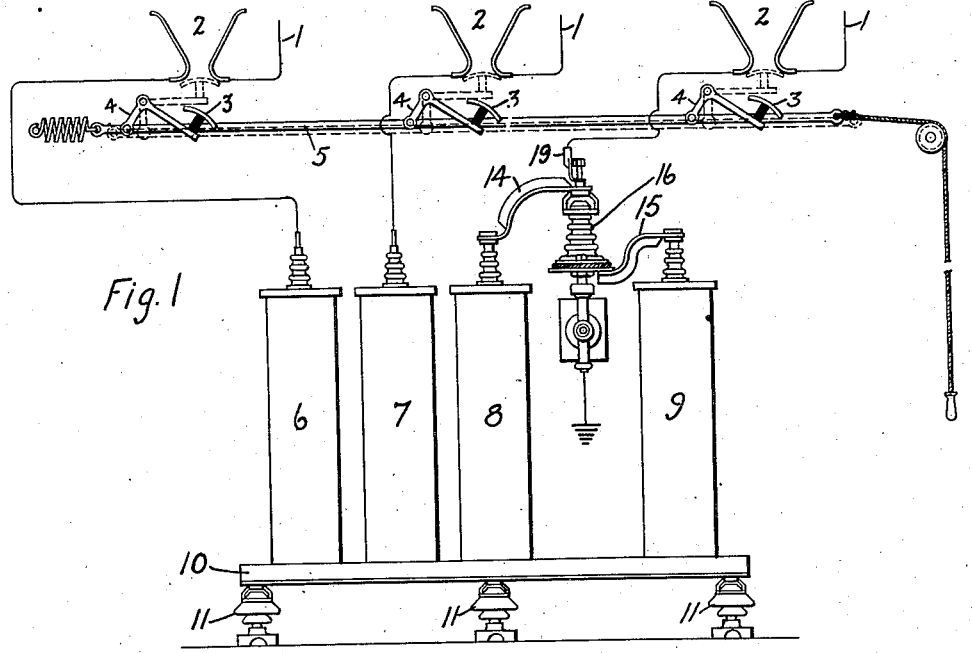

E. E. F. CREIGHTON.
LIGHTNING ARRESTER.
APPLICATION FILED AUG. 26, 1909.

989,487.

Patented Apr. 11, 1911.
2 SHEETS—SHEET 1.

Witnesses:
Lloyd C. Bush
Marcus L. Byng.

Inventor:
Elmer E. F. Creighton,
By
Atty.

E. E. F. CREIGHTON.
LIGHTNING ARRESTER.
APPLICATION FILED AUG. 26, 1909.
989,487.
Patented Apr. 11, 1911.
2 SHEETS—SHEET 2.
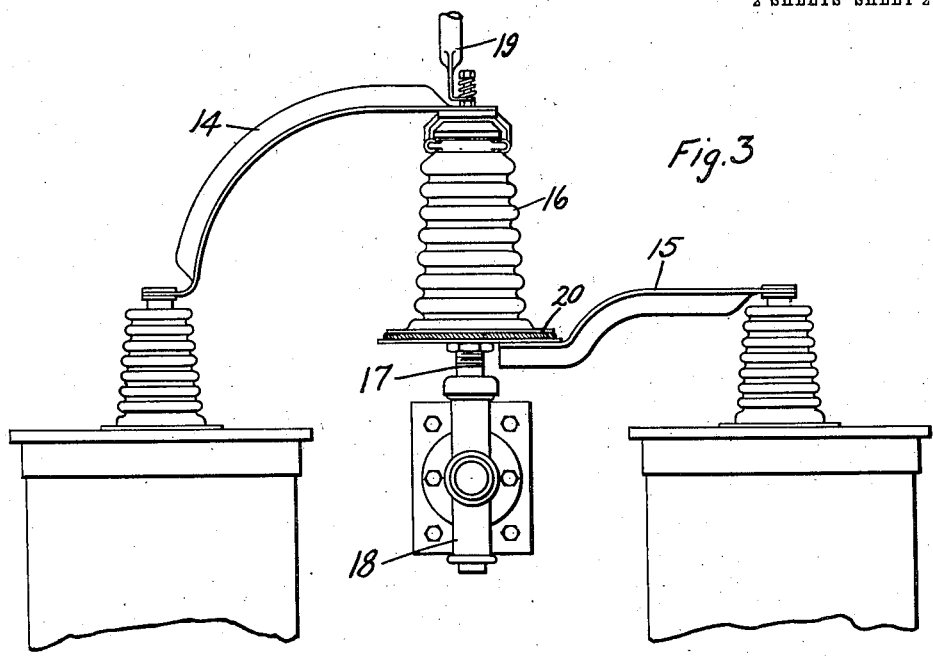
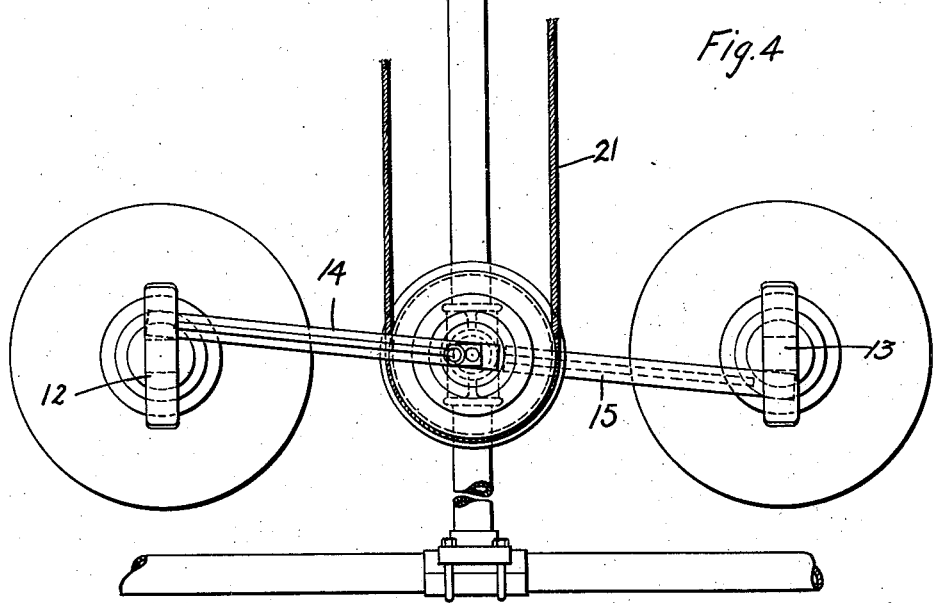
Witnesses:
Lloyd C. Bush
Marcus L. Byng
Inventor:
Elmer E. F. Creighton,
By Albert G. Davis
Atty.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

LIGHTNING-ARRESTER.

989,487.  Specification of Letters Patent.  Patented Apr. 11, 1911.

Application filed August 26, 1909. Serial No. 514,672.

*To all whom it may concern:*

Be it known that I, ELMER E. F. CREIGHTON, a citizen of the United States, residing at Schenectady, in the county of Schenectady, State of New York, have invented certain new and useful Improvements in Lightning-Arresters, of which the following is a specification.

My invention relates to lightning arresters and more particularly to lightning arresters of the type in which a number of electrolytic cells or condensers are connected between the conductors of the system to be protected and ground.

Electrolytic cells or condensers when used as lightning arresters for a transmission line are generally connected to the conductors of the transmission line through spark gaps set to break down at voltages slightly above the normal potential of the system whereby the abnormal potential discharges through the spark gap and the aluminum arrester to ground. Under these conditions the electrolytic cells are normally entirely disconnected from the line and the film on the electrodes of the cells gradually deteriorates, so that it is necessary to pass current through the cells at intervals in order to maintain the cell in good condition, and as the cells are proportioned to break down at a voltage somewhat higher than the normal voltage of the transmission system the full potential of the system must be applied in order to send enough current through the cell to build up the film. It is also customary on a polyphase transmission system to provide as many electrolytic cells as there are conductors, each cell being connected at one terminal to the conductor and the other terminals being electrically connected at a common or neutral point, which in turn is connected to ground through an additional or ground cell. With this arrangement it is easy to apply the normal potential of the system to the cells which are directly connected to the conductors, but it is difficult to send enough current through the ground cell to keep its film in good condition, and the object of my invention is to arrange the connections of the electrolytic cells in such a manner that the ground cell may be subjected to the normal potential of the line and thereby all of the cells be kept in good condition; to provide an improved form of transfer switch for controlling the connections of the cells to ground and to the conductors, and in general to improve the construction of lightning arresters of the electrolytic type.

In carrying out my invention I provide a selective controlling or switching mechanism for the condensers by means of which the operator can arbitrarily select a cell and connect it as a ground cell while the remaining cells are connected to the conductors. If the film on the ground cell deteriorates, another cell can be connected in as the ground cell while the one which was first used as the ground cell is connected to the line and by transposing the cells and charging them in the usual way, the films in all the cells can be kept in good condition. In the preferred construction, two cells are mounted side by side and are alternately used as ground cells, while the remaining cells which constitute the arrester are directly connected to the conductors. By means of a suitable control or switching mechanism either one of the two above mentioned electrolytic cells may be connected to ground, while the other one is connected to one of the conductors of the transmission system. Whenever the operator desires to do so the switch mechanism may be manipulated to interchange the connections so that the cell which was the ground cell is directly connected to the conductor and the other cell becomes the ground cell. Various forms of switching mechanism may be used for accomplishing this purpose, but in the preferred construction the switch is a rotatable switch mounted between the two electrolytic cells and provided with switch blades which coöperate with the terminals of both cells, one of the switch blades being grounded and the other connected to the conductor of the transmission system, so that the relation of the two cells to ground and to the conductor may be transposed by altering the position of the switch.

My invention will best be understood in connection with the accompanying drawings which show, merely for purposes of illustration, one of the many forms in which my invention may be embodied and in which—

Figure 2:
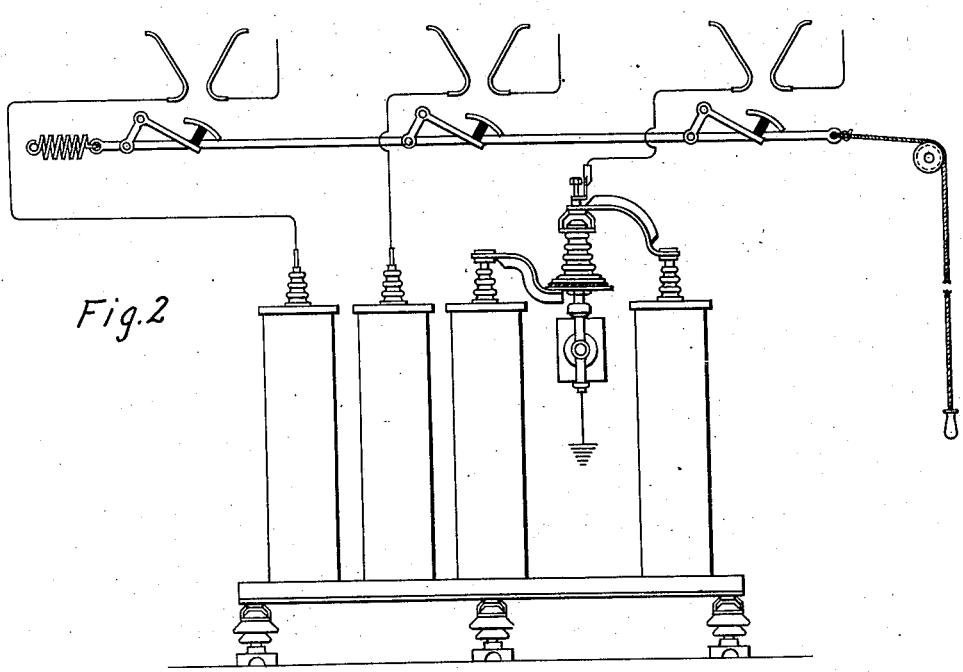

Figure 1 is a diagrammatic view showing my invention embodied in an electrolytic arrester applied to a transmission system having three conductors, and showing a cell on the right connected as the ground cell; Fig. 2 is a diagrammatic view of the same showing the connections interchanged so that the cell on the right is connected directly to the line while the adjacent cell is connected as the ground cell; Fig. 3 is an enlarged view in elevation of the transfer switch by means of which the connections are controlled; and Fig. 4 is a plan view of the switch shown in Fig. 3.

In the specific arrangement shown in Fig. 1, the three conductors 1 of the three phase system are connected through spark gaps 2 to the electrolytic cells which protect the system against abnormal potential. To enable the operator to apply at will the potential of the system to the electrolytic cells and thereby maintain the films in good condition bridging members 3 are mounted on levers 4 which in turn are operated by a longitudinally movable insulating rod 5 which may be actuated at will by the operator. Any suitable form of bridging device may be used in connection with the spark gaps 2, the arrangement shown in the drawings being merely for purposes of illustration.

As shown in Figs. 1 and 2, the conductors 1 of the transmission system are connected to an electrolytic arrester having four cells 6, 7, 8 and 9, which in the particular arrangement shown in the drawings are mounted upon a conducting strip or base 10 which is insulated from ground by means of insulators 11. Each cell 6 and 7 is directly connected to one of the conductors 1 of the transmission system and all of the cells have their corresponding terminals electrically connected in any suitable way, preferably through the conducting base 10.

By means of suitable switching connections between the cells 8 and 9 and one of the conductors of the transmission system, either the cell 8 or 9 may be connected in as the ground cell and the other connected directly to the line. In the specific arrangement shown in the drawings, the upper terminals of the cells 8 and 9 are provided with double clips 12 and 13, as best shown in Fig. 4, and these clips coöperate with the conducting blades 14 and 15 of a transfer switch comprising a movable insulator 16 which holds the two conductor blades 14 and 15 in definite relation to each other, but insulated from each other, the insulator in turn being mounted upon a vertical shaft 17 carried in a bearing or bracket 18 which is grounded, as diagrammatically shown in Figs. 1 and 2. The conducting blade 15 is mounted on the shaft 17 and is thereby connected to ground while the other blade 14 is connected through any suitable connector 19 to a conductor of the transmission system. As shown in the drawings, the conducting blades 14 and 15 are bent so that their free ends will swing in the same plane and will engage the double ended clips 12 and 13 on the terminals of the two cells 8 and 9. The contact blades are so related to each other that when one blade is in engagement with the contact clip 12 the other blade is simultaneously in engagement with the contact clip 13. The switch may be operated in any suitable manner, the preferred construction being that shown in the drawing, in which a grooved pulley 20 is mounted on the shaft 17 and is operated from a distance by means of a rope 21.

When the parts are in the position shown in Fig. 1, the three cells 6, 7 and 8 are directly connected to the three conductors of the transmission system and the cell 9 is the ground cell, the cell 8 being connected to one of the conductors through the contact clip 12, blade 14 and connection 19, while the cell 9 has its upper terminal connected to ground through the clip 13 and the grounded conducting blade 15. If the gaps 2 are now bridged by means of the bridging members 3 the three conductors 6, 7 and 8 will receive full potential, but the cell 9 will not and, therefore, its film will be defective. The relation of the two cells 8 and 9 to each other and to the transmission system is transposed by rotating the switch into the position shown in Fig. 2, in which case the cell 9 is directly connected to the line through the blade 14 and the connection 19, while the cell 8, in which a good film was formed when the full potential of the system was applied to it, is now connected through the grounded blade 15 to ground and acts as the ground cell. If under these conditions the spark gaps 2 are again bridged the cell 9 will receive the full potential of the line and its film will be built up, so that the films in all four cells are put in good condition.

My invention may be embodied in many other forms than that described and disclosed and I therefore do not limit my invention to the specific arrangement shown, but aim in the appended claims to cover all modifications within the spirit and scope of my invention.

Having now fully described my invention, what I claim as new and desire to secure by Letters Patent of the United States, is:

1. The combination with two electrolytic condensers having their corresponding terminals electrically connected, of a grounding switch mounted to coöperate with the other terminals of said condensers and thereby ground either one of said other terminals at will.

2. The combination with a conducting base insulated from ground, of two electrolytic condensers mounted on said base with their corresponding terminals connected thereto, and a switch provided with a grounded blade mounted to coöperate with the other terminal of said condensers to ground either one of said condensers at will.

3. The combination with three conductors of a transmission system, of four electrolytic condensers mounted side by side with corresponding terminals in electrical connection and the other terminals of two of said condensers directly connected to two of said conductors, and a transfer switch connected to the third conductor and mounted to coöperate with the terminals of the two remaining condensers and thereby connect at will either of said remaining condensers to ground and the other condenser to said third conductor.

4. The combination with a conducting base insulated from ground, and a plurality of electrolytic condensers mounted on said base with their corresponding terminals connected thereto, of a movable switch member comprising two conducting blades insulated from each other and mounted to engage simultaneously the other terminals of two adjacent condensers, means for grounding one of said conducting blades, and operating means for actuating said switch member at will.

5. The combination with a line conductor, of two electrolytic condensers with their corresponding terminals electrically connected, a rotatable switch connected to said conductor and mounted between the other terminals of said condensers for coöperating with both said terminals, and connections between said switch and ground whereby said switch connects at will either condenser to ground and simultaneously connects the other condenser to said conductor.

6. The combination with a line conductor and two electrolytic condensers mounted side by side with corresponding terminals in electrical connection, of a rotatable transfer switch mounted between the other terminals of said condensers and comprising two conducting blades insulated from each other and simultaneously movable into engagement with opposite terminals, connections between one of said blades and said conductor, and connections between the other of said blades and ground whereby through said switch either of said condensers may be connected to ground while the other is simultaneously connected to said conductor.

7. The combination with two electrolytic condensers mounted side by side with their corresponding terminals in electric connection, of contact clips mounted on the other terminals of said condensers, an insulator rotatably mounted between said terminals, contact blades secured to opposite ends of said insulator to engage said contact clips, means for grounding one of said blades and means for rotating said insulator.

8. The combination with two electrolytic condensers having their corresponding terminals electrically connected, of a switch comprising a grounded blade and an insulated blade which engages either of the other terminals at will, whereby either of said other terminals may be connected to ground at will while the other is connected to said insulated switch blade.

9. The combination with two electrolytic condensers, of contact clips mounted on adjacent terminals of said condensers, and a grounded switch blade mounted to coöperate with the contact clips on either of said terminals, a second contact blade mounted on and insulated from the first blade in a position to cause both contact blades to engage simultaneously opposite contact clips on opposite terminals, and means for actuating said switch blades.

10. The combination with two electrolytic condensers, of contact clips on adjacent terminals of said condensers, an insulator rotatably mounted in alinement with said terminals, a grounded contact blade mounted on one end of said insulator in a position to coöperate with either of said contact clips, a contact blade mounted on the other end of said insulator to extend diametrically opposite the first contact blade and to coöperate with both said contact clips, and means for rotating said insulator at will to connect either of said terminals to ground.

In witness whereof, I have hereunto set my hand this 24th day of August, 1909.

ELMER E. F. CREIGHTON.

Witnesses:
   BENJAMIN B. HULL,
   MARGARET E. WOOLLEY.